US009692040B2

(12) United States Patent
Zaghib et al.

(10) Patent No.: US 9,692,040 B2
(45) Date of Patent: Jun. 27, 2017

(54) ELECTRODE COATED WITH A FILM OBTAINED FROM AN AQUEOUS SOLUTION COMPRISING A WATER-SOLUBLE BINDER, PRODUCTION METHOD THEREOF AND USES OF SAME

(71) Applicant: HYDRO-QUEBEC, Montreal, Quebec (CA)

(72) Inventors: Karim Zaghib, Longueuil (CA); Michel Armand, Saint Martin d'Uriage (FR); Abdelbast Guerfi, Brossard (CA); Michel Perrier, Montreal (CA); Elisabeth Dupuis, McMasterville (CA); Patrick Charest, Sainte-Julie (CA)

(73) Assignee: HYDRO-QUEBEC, Montreal, Quebec (CA)

( * ) Notice: Subject to any disclaimer, the term of this patent is extended or adjusted under 35 U.S.C. 154(b) by 0 days.

(21) Appl. No.: 15/014,469

(22) Filed: Feb. 3, 2016

(65) Prior Publication Data

US 2016/0156017 A1    Jun. 2, 2016

Related U.S. Application Data

(62) Division of application No. 10/534,697, filed as application No. PCT/CA03/01739 on Nov. 13, 2003, now Pat. No. 9,293,769.

(30) Foreign Application Priority Data

Nov. 13, 2002    (CA) ..................................... 2411695

(51) Int. Cl.
*H01M 4/04*        (2006.01)
*H01G 11/42*       (2013.01)
(Continued)

(52) U.S. Cl.
CPC .......... *H01M 4/0404* (2013.01); *H01G 11/06* (2013.01); *H01G 11/24* (2013.01);
(Continued)

(58) Field of Classification Search
CPC .. H01M 2/145; H01M 2/1653; H01M 4/0404; H01M 4/0409; H01M 4/139; H01M 4/1391; H01M 4/1393
See application file for complete search history.

(56) References Cited

U.S. PATENT DOCUMENTS 3,877,983 A    4/1975    Hovsepian
5,219,680 A    6/1993    Fauteux
(Continued)

FOREIGN PATENT DOCUMENTS

CA    2658741 A1    10/2000
EP    0 573 266 A    12/1993
(Continued)

OTHER PUBLICATIONS

"Wire-Wound Rod Coating", Coating Technology Handbook by Satas Armek, 1991, Part II, Coating and Processing Technics, pp. 103-320.
(Continued)

*Primary Examiner* — Mark F Huff
*Assistant Examiner* — Monique Wills
(74) *Attorney, Agent, or Firm* — Buchanan Ingersoll & Rooney P.C.

(57) ABSTRACT

A method of preparing an electrochemical electrode which is partially or totally covered with a film that is obtained by spreading an aqueous solution comprising a water-soluble binder over the electrode and subsequently drying same. The production cost of the electrodes thus obtained is reduced and the surface porosity thereof is associated with desirable resistance values.

9 Claims, 5 Drawing Sheets

(51) Int. Cl.

| | | |
|---|---|---|
| *H01G 11/46* | (2013.01) | |
| *H01G 11/86* | (2013.01) | |
| *H01M 2/14* | (2006.01) | |
| *H01M 2/16* | (2006.01) | |
| *H01M 4/139* | (2010.01) | |
| *H01M 4/1391* | (2010.01) | |
| *H01M 4/1393* | (2010.01) | |
| *H01M 4/1397* | (2010.01) | |
| *H01M 4/36* | (2006.01) | |
| *H01M 4/58* | (2010.01) | |
| *H01M 4/62* | (2006.01) | |
| *H01M 10/0569* | (2010.01) | |
| *H01G 11/24* | (2013.01) | |
| *H01G 11/28* | (2013.01) | |
| *H01G 11/30* | (2013.01) | |
| *H01G 11/32* | (2013.01) | |
| *H01G 11/06* | (2013.01) | |
| *H01M 4/133* | (2010.01) | |
| *H01M 4/136* | (2010.01) | |
| *H01M 4/587* | (2010.01) | |
| *H01M 4/66* | (2006.01) | |
| *H01M 10/0525* | (2010.01) | |
| *H01M 10/0565* | (2010.01) | |
| *H01M 10/0568* | (2010.01) | |
| *H01M 4/02* | (2006.01) | |

(52) U.S. Cl.
CPC ............ *H01G 11/28* (2013.01); *H01G 11/30* (2013.01); *H01G 11/32* (2013.01); *H01G 11/42* (2013.01); *H01G 11/46* (2013.01); *H01G 11/86* (2013.01); *H01M 2/145* (2013.01); *H01M 2/1653* (2013.01); *H01M 4/04* (2013.01); *H01M 4/0409* (2013.01); *H01M 4/133* (2013.01); *H01M 4/136* (2013.01); *H01M 4/139* (2013.01); *H01M 4/1391* (2013.01); *H01M 4/1393* (2013.01); *H01M 4/1397* (2013.01); *H01M 4/366* (2013.01); *H01M 4/587* (2013.01); *H01M 4/5825* (2013.01); *H01M 4/621* (2013.01); *H01M 4/622* (2013.01); *H01M 4/623* (2013.01); *H01M 4/66* (2013.01); *H01M 10/0525* (2013.01); *H01M 10/0565* (2013.01); *H01M 10/0568* (2013.01); *H01M 10/0569* (2013.01); *H01M 2004/027* (2013.01); *H01M 2004/028* (2013.01); *H01M 2300/004* (2013.01); *H01M 2300/0028* (2013.01); *H01M 2300/0037* (2013.01); *H01M 2300/0042* (2013.01); *H01M 2300/0082* (2013.01); *Y02E 60/122* (2013.01); *Y02E 60/13* (2013.01); *Y02P 70/54* (2015.11)

(56) References Cited

U.S. PATENT DOCUMENTS

| | | | |
|---|---|---|---|
| 6,190,804 B1 | 2/2001 | Ishiko et al. | |
| 6,200,706 B1 * | 3/2001 | Ashida | D04H 1/54 429/247 |
| 6,416,902 B1 * | 7/2002 | Miyasaka | H01M 4/131 429/223 |
| 6,451,487 B1 | 9/2002 | Besner et al. | |
| 6,680,882 B2 | 1/2004 | Ikedo et al. | |
| 7,457,018 B2 | 11/2008 | Armand et al. | |
| 2001/0019800 A1 | 9/2001 | Herreyre et al. | |
| 2002/0025477 A1 | 2/2002 | Itagaki et al. | |
| 2002/0034691 A1 * | 3/2002 | Segawa | H01M 2/1673 429/306 |
| 2002/0055046 A1 | 5/2002 | Ono et al. | |
| 2002/0102459 A1 | 8/2002 | Hosoya et al. | |
| 2002/0106564 A1 * | 8/2002 | Okawa | H01M 4/136 429/221 |
| 2002/0114754 A1 | 8/2002 | Hosoya et al. | |
| 2003/0064290 A1 | 4/2003 | Li | |
| 2003/0143465 A1 | 7/2003 | Takahashi et al. | |
| 2004/0002003 A1 | 1/2004 | Yamada et al. | |
| 2004/0062989 A1 | 4/2004 | Ueno et al. | |
| 2004/0157126 A1 | 8/2004 | Belharouak et al. | |
| 2006/0188782 A1 | 8/2006 | Yamada et al. | |

FOREIGN PATENT DOCUMENTS

| | | |
|---|---|---|
| EP | 1081777 A2 | 3/2001 |
| EP | 1 172 878 A2 | 1/2002 |
| EP | 1195835 A2 | 4/2002 |
| EP | 1 306 912 A1 | 5/2003 |
| JP | H04-342966 A | 11/1992 |
| JP | H05-225982 A | 9/1993 |
| JP | 6-295744 | 10/1994 |
| JP | 8-250123 | 9/1996 |
| JP | H08-250123 A | 9/1996 |
| JP | 9-199135 A | 7/1997 |
| JP | H11-283623 | 10/1999 |
| JP | 2000-348711 A | 12/2000 |
| JP | 2001-155737 A | 6/2001 |
| JP | 2001-250553 A | 9/2001 |
| JP | 2001-283837 A | 10/2001 |
| JP | 2002-015735 A | 1/2002 |
| JP | 2002-110162 A | 4/2002 |
| JP | 2002-117836 A | 4/2002 |
| JP | 2002-117837 A | 4/2002 |
| JP | 2002-117860 A | 4/2002 |
| JP | 2002-117902 A | 4/2002 |
| JP | 2002-151072 A | 5/2002 |
| JP | 2002-158012 A | 5/2002 |
| JP | 2002151082 | 5/2002 |
| JP | 2002-170567 A | 6/2002 |
| JP | 2002-231222 A | 8/2002 |
| JP | 2002-256129 A | 9/2002 |
| JP | 2002279989 | 9/2002 |
| JP | 2004055493 | 2/2004 |
| WO | 00/60680 A1 | 10/2000 |
| WO | WO 02/27823 A1 | 4/2002 |
| WO | WO 0247188 A1 | 6/2002 |

OTHER PUBLICATIONS

M. Alonso et al., "Mechanism of the Combined Coating-Mechanofusion Processing of Powders", Powder Technology, 59 (1989) pp. 45-52, Elsevier Sequoia/Printed in the Netherlands.

An English Translation of the Japanese Office Action (Notice of Rejection) issued on Sep. 30, 2016, by the Japanese Patent Office in corresponding Japanese Patent Application No. 2015-204686. (9 pages).

* cited by examiner

ELECTRODE COATED WITH A FILM OBTAINED FROM AN AQUEOUS SOLUTION COMPRISING A WATER-SOLUBLE BINDER, PRODUCTION METHOD THEREOF AND USES OF SAME

CROSS REFERENCE TO RELATED APPLICATIONS

The present application is a continuation of U.S. application Ser. No. 10/534,697, filed on Nov. 16, 2005, which is a U.S. national stage of International Application No. PCT/CA2003/001739, filed on Nov. 13, 2003, which claims the benefit of Canadian Application No. 2,411,695, filed on Nov. 13, 2002. The entire contents of each of U.S. application Ser. No. 10/534,697, International Application No. PCT/CA2003/001739, and Canadian Application No. 2,411,695 are hereby incorporated herein by reference in their entirety.

FIELD OF THE INVENTION

The present invention relates to a new process for preparing electrochemical electrodes and electrodes thus obtained. The process makes it possible to prepare electrodes that are completely or partly coated with a film obtained by spreading and drying, on the electrode, an aqueous solution containing a water soluble binder and an active material.

A second aspect of the invention concerns processes for preparing electrochemical systems involving at least one step for preparing electrodes according to the invention and the electrochemical systems thus obtained.

A second aspect of the present invention relates to the use of a water soluble polymer, as a binder in an aqueous solution for the preparation of a film for coating part or the totality of an electrode.

The present invention also provides a new process for manufacturing a Li-ion natural graphite/electrolyte/LiFePO$_4$ battery, which is all liquid, all gel or solid.

PRIOR ART

U.S. Pat. No. 6,680,882 describes an aprotic electrolytic composition that is placed in a separator and in at least one composite electrode containing a powder of an active material. The electrolytic composition used comprises a first polymer matrix consisting of a polymer and at least one second polymer matrix as well as at least one alkali salt and a polar aprotic solvent. This process has the disadvantages associated with the use of binders of the PVDF type as diluted in solvents classified as toxic with respect to the environment.

SUMMARY OF THE INVENTION

Figure 1:
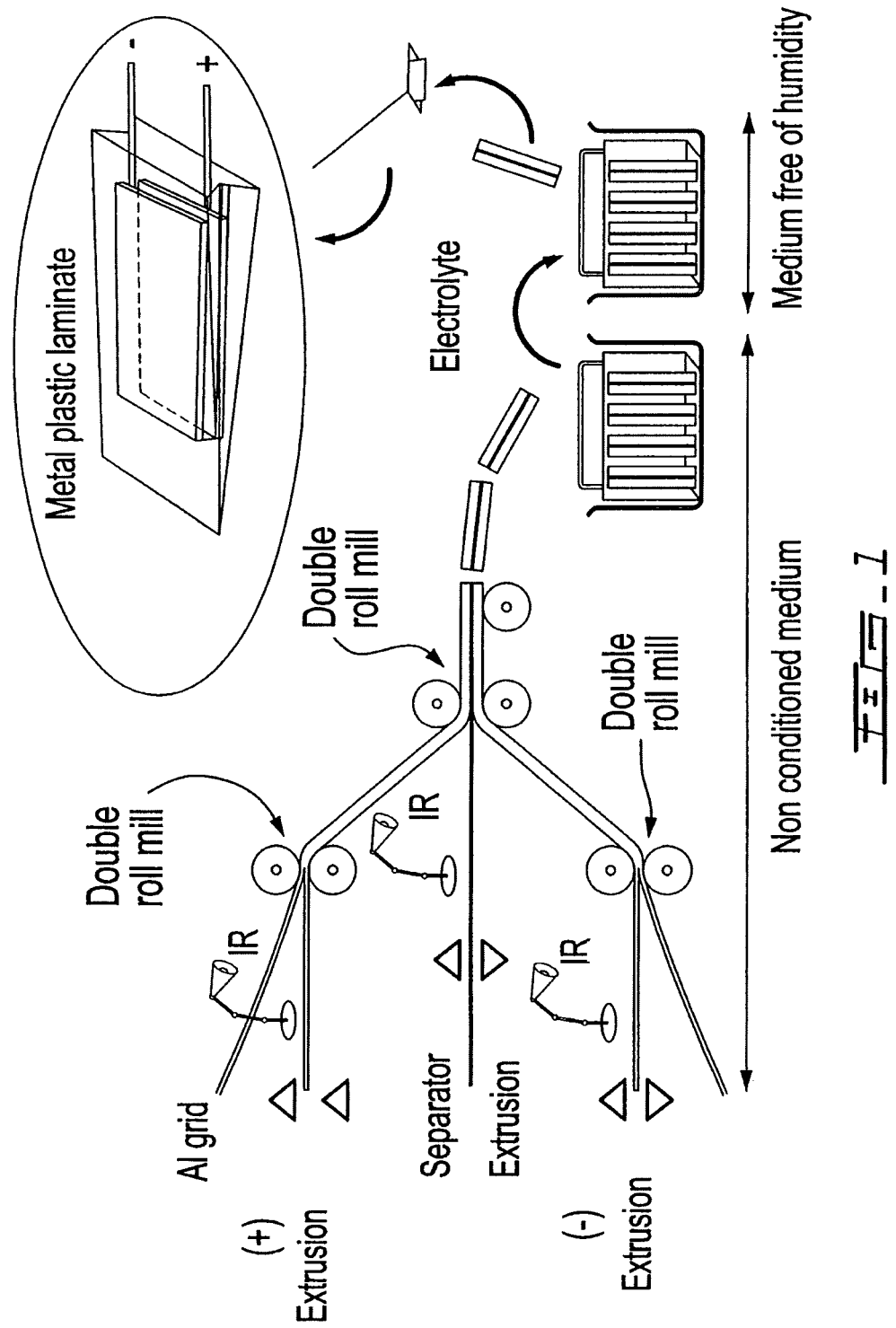
FIG. 1 is a schematic representation of a process according to an embodiment of the invention for the preparation of lithium ion batteries by extrusion.
Figure 2:
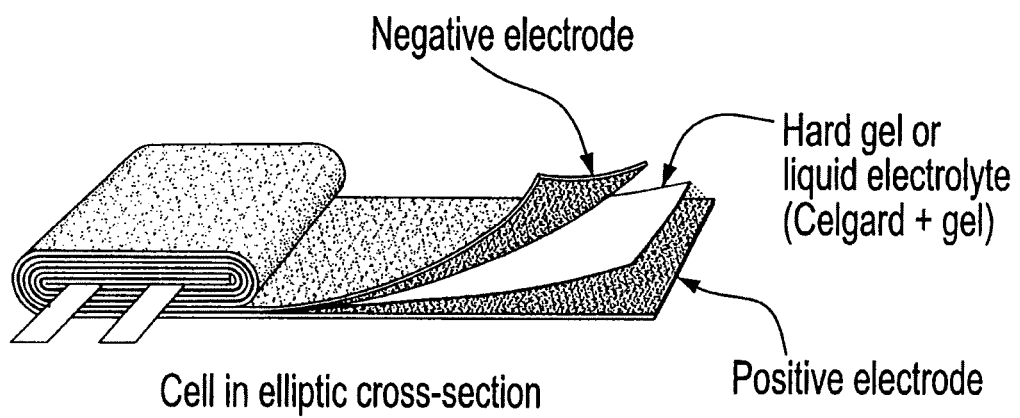
FIG. 2 represents an elliptic cross-section of the elements of a lithium ion battery according to the invention.
Figure 3:
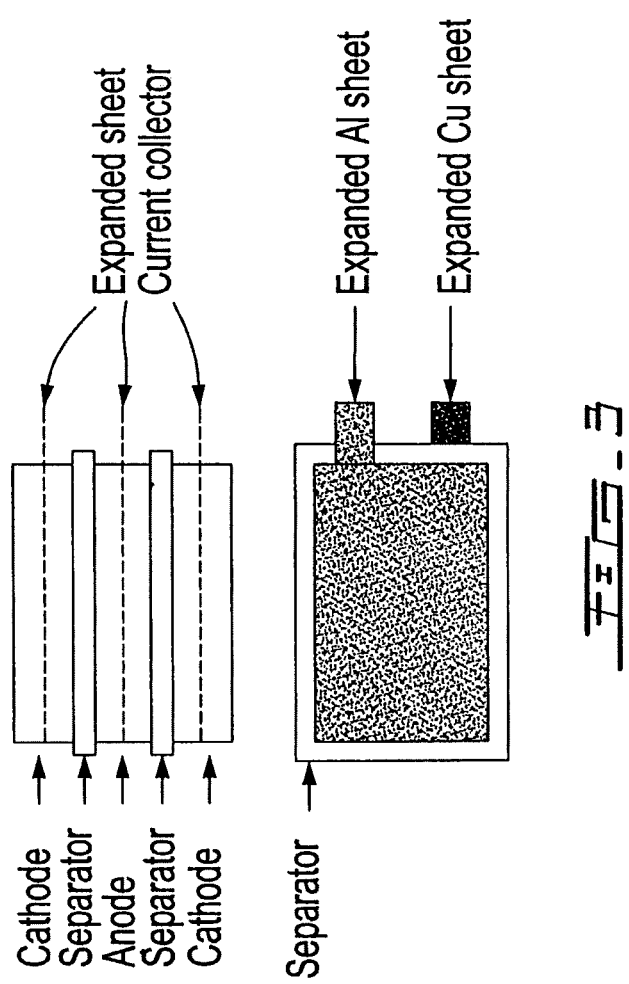
FIG. 3 is a schematic representation of a bi-cell structure for polymer cells.
Figure 4:
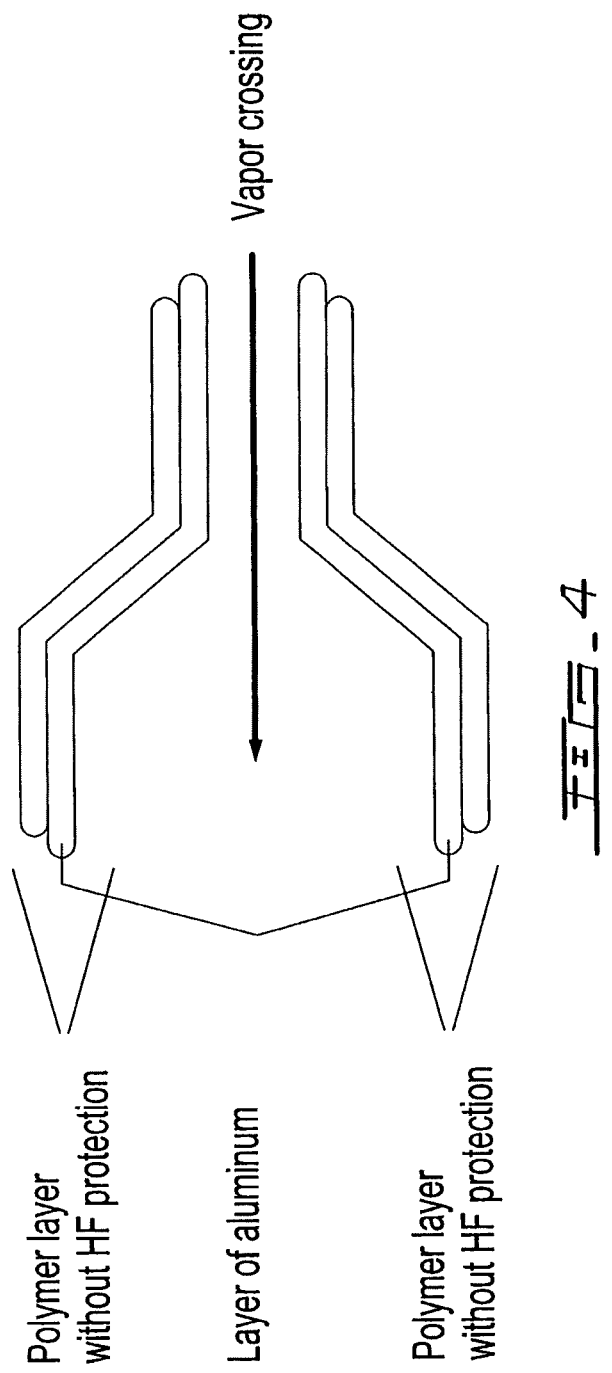
FIG. 4 is a schematic representation of a metal plastic wrapping without HF protection layer for non-polymer batteries.

The invention relates to a process for preparing an electrode that is at least partly coated with a film obtained by spreading and drying, on an electrode support, an aqueous solution comprising at least one active material, at least one water soluble binder and at least one water soluble thickener. Besides its economic advantages, the process overcomes the environmental problem involved when using organic solvents. The electrodes thus obtained are performing and can advantageously be used in the manufacture of electrochemical systems that are stable and highly performing.

DETAILED DESCRIPTION OF THE INVENTION

Within the framework of the present invention the term binder means any chemical compound whose function is to connect the active particles together in order to provide a chemical or electrochemical network that is favorable to conduction.

Within the framework of the present invention the term thickener means any chemical compound that is capable of increasing the viscosity and the wettability of the hydrophobic particles that are present in the concerned solutions.

A first object of the present invention consists of a process for preparing an electrode that is at least partly coated with a film obtained by spreading and drying, on an electrode support, an aqueous solution comprising at least one active material, i.e. chemically and/or electrochemically active, at least one water soluble binder and at least on water soluble thickener.

Spreading is advantageously carried out by traditional techniques described for example in Coating Technology Handbook by Satas Armek 1991, part II, Coating and Processing Technics pages 103 to 321. Drying of the film that is spread on the electrode is advantageously carried out for a period between 1 and 2 hours and at a temperature preferably between 80 and 130° Celsius.

The active material used is advantageously selected from the group consisting of:
  metallic oxides;
  ceramics;
  carbon, natural graphite and synthetic graphite;
  metals;
  semi-conductor materials; and
  mixtures of at least two thereof.

According to another advantageous embodiment, the metallic oxide is selected from the group consisting of LiMn$_2$O$_4$, LiCoO$_2$ and LiNiO$_2$. For its part, the carbon may be selected from the group of high surface carbon, graphite, carbon fibers and cokes. The metals that are advantageously retained are selected from the group consisting of Ag, Sn and Cu. Among the semi-conductor materials, silicon gives particularly interesting results.

The chemically and/or electrochemically active material used is generally in the form of powder whose average particle size is between 10 nanometers and 10 millimeters and having a relatively low granular dispersion advantageously corresponding to a gap of D50-D10=30 and a gap of D90-D50=30.

According to a preferred mode, for example for the preparation of electrodes for automobile batteries, the powder that is retained has a granular dispersion between 200 nanometers and 25 micrometers.

At least 20% of the binder and thickener retained are generally water soluble when they are introduced, at room temperature, at the rate of 20 grams in 200 grams of water. Preferably, at least 50% and still more advantageously at least 90% are soluble.

The water soluble thickener may be selected from the group consisting of natural celluloses, physically and/or chemically modified celluloses, natural polysaccharides, chemically and/or physically modified polysaccharides and which have a molecular weight between 27,000 and 250,000.

The thickener is advantageously selected from the group consisting of carboxymethylcelluloses, hydroxymethylcelluloses and methylethylhydroxycelluloses.

According to a preferred mode, the thickener is selected from the group consisting of carboxymethylcelluloses, of the Cellogen® type sold by Dai-ichi Kogyo Seiyaku Co. of Japan for example under the commercial designations EP, 7A, WSC, BS-H and 3H.

The soluble binder is advantageously selected from the group consisting of natural and/or synthetic rubbers.

The binder is of the non-fluorinated type or of the low fluorinated type. Indeed, by way of example, LiF, not being soluble in water, cannot be used in the context of the invention.

Among the rubbers, those of the synthetic type and more particularly those selected from the group consisting of SBR, (styrene butadiene rubber), NBR (butadiene-acrylonitrile rubber), HNBR (hydrogenated NBR), CHR (epichlorhydrin rubber) and ACM (acrylate rubber) are particularly advantageous.

The soluble rubbers used, and for example those of the SBR family, are preferably in the form of a paste.

By way of example, SBR sold by NIPPON ZEON'S BINDER BATTERY GRADE under commercial designation (BM-400B) or equivalent and the thickeners of the Cellogen® known under the abbreviations EP and/or 3H may be mentioned.

Normally, the thickener/binder ratio varies between 10 and 70%, preferably between 30 and 50%.

The binder content is advantageously between 1 and 70%, and that of the thickener is between 1 and 10%, in the aqueous solution.

An aqueous solution that is adequately used for spreading on an anode support may be formulated as follows, the percentages being given in weight:
  at least 64% graphite; and
  at least 3% water soluble binder,
  from 0.1 to 2% thickener; and
  at most 27% water.

An aqueous solution adapted for spreading on a cathode support may be formulated as follows, the aqueous solution used for spreading containing by weight:
  at least 64% LiFePO$_4$; and
  at least 3% water soluble binder,
  from 0.1 to 2% thickener; and
  at most 27% water.

When implementing the process, the electrode is dried by removing, preferably, at least 95% of water that is present in the solution used to carry out the spreading step.

Various techniques known to one skilled in the art can be used to remove the traces of $H_2O$ that are present at the surface of the electrode, after coating the latter with the aqueous solution. These traces of water are removed by thermal means on line of the EXT, DBH and/or DB process, or by infra-red at a temperature advantageously between 80 and 130° Celsius for a period between 1 and 12 hours.

The film is advantageously dried until its residual water content is lower than 2000 ppm and preferably lower than 50 ppm.

This process is advantageously applied to electrodes of the non-salted type, i.e. to the electrodes of the invention made of an active material, carbon and a thickener and/or a binder.

The process is usually carried out at room temperature and pressure. An inert atmosphere may be used, as well as a partial vacuum during the drying step. Because no organic solvents are used, the extrusion process is particularly important. Indeed, the risks inherent to the use of solvent, such as risks of explosion are set aside and the work can be carried out, for example according to an embodiment, by extrusion, under more energetic conditions, for example at extrusion speeds that can be as much as 20% higher.

For the production of negative electrodes according to the invention, the electrochemically active material used may be selected from the group consisting of graphite, Sn alloys, Si alloys, $Li_4Ti_5O_{12}$, $WO_2$ type powders and mixtures obtained from at least two of these powders. By way of examples of such powders, those consisting of particles having an ellipsoidal graphite nucleus coated with prismatic shaped graphite particles, may be mentioned. Coating of ellipsoidal graphite with prismatic graphite may be obtained by mechano-fusion, also known as mechano-melting and/or hybridization.

When it is desired to prepare a positive electrode, the electrochemically active material is preferably selected from $LiCoO_2$, $LiNiO_2$, $Li_2Mn_2O_4$, $LiNi_{0.5}Mn_{0.5}O_2$, $LiFePO_4$ powders that are coated with graphite and carbon and mixtures of at least two thereof.

For example, electrodes of the type $LiFePO_4$ coated with graphite and/or carbon can be obtained. Coating $LiFePO_4$ with graphite and/or carbon is normally carried out by mechano-fusion, also known as mechano-melting and/or by hybridization.

The specific surface area of the carbon that is present in the coating may vary widely; the one measured by BET, was identified as being in most cases higher than or equal to 50 $m^2/g$.

This process also makes it possible to prepare an electrochemical separator that is at least partly coated with a film of the polymer type, preferably of the water soluble SBR type.

Such a process for preparing an electrochemical separator is in accordance with the processes of preparing electrodes as previously defined, except that the aqueous polymer solution used contains no active materials nor carbon or only very small quantities thereof. Indeed, the separator is used for ionic transport between the anode and the cathode, and it is not electronically conductive.

A second object of the present invention consists of an electrode that is made of a support that is coated at least in part with a film containing an active material, the electrode being obtained by implementation of one of the processes according to the first object previously defined. These electrodes are characterized in that the binder, after drying the aqueous solution used to constitute the spreading film, is pulled away from the support.

In the case of a cathode, the electrode support advantageously comprises at least in part stainless, aluminum, copper, carbon, metal-plastic or a mixture of at least two of these materials.

In the case of an anode, the electrode support advantageously comprises at least in part copper, metal-plastic, or a mixture thereof.

The electrodes of the invention have advantageously at least one of the following properties:

- storage stability, preferably greater than 1 year, in the presence of a moisture content higher than 50% and in the presence of temperatures higher than 20° Celsius;
- a film thickness, when the latter is graphite based, that is between 10 and 100 µm, still more preferably between 20 and 45 µm and according to the most advantageous mode the film has a thickness of about 45 µm;
- a film thickness when the latter is iron and/or phosphate based, that is between 20 and 200 µm, still more preferably between 20 and 110 µm, the most advantageous mode being the one in which the film has a thickness of about 90 µm;
- electrochemical performances that compare to those of corresponding electrodes obtained with the same active material but by using an organic solvent solution;
- an electrode film characterized by the fact that particles of rubber are directly attached to the electrode support; and
- a porosity of the film that coats one or more of the electrodes, measured by the method of measuring thicknesses, that is between 10 and 90%, preferably between 30 and 40%.

A third object consists of a process for preparing an electrochemical system by assembling is constituents including at least one anode, at least one cathode and at least one separator, in which at least one anode and/or at least one cathode has been obtained by a process according to the first object of the invention or as defined in the second object of the invention.

This process is advantageously used for the preparation of a battery in which the separator is porous. The separator is for example of the polypropylene or polyethylene type or of the (PP,PE) mixture type and obtained by extrusion, and/or of gel type.

The separator is preferably obtained from polymer materials of the type:

- polyester,
- poly(vinylydienefluoride), also called (PVDF), of chemical formula $(CH_2—CF_2)_n$, in which n preferably varies between 1000 and 4000, preferably such that n is close to 150; among those polymers those having an average molecular weight between 10,000 and 1 million, still more preferably those having an average molecular weight between 100,000 and 250,000 are particularly interesting;
- poly(vinylydiene fluoro-co-hexafluoropropene) copolymers, of formula $[(CH_2—CF_2)_x(CF_2—CF(CF_3))_{1-x}]_n$ also called (PVDF-HFP), in which n varies between 1000 and 4000, preferably n varies from 2000 to 3000, still more preferably n is close to 150 and x preferably varies between 0.12 and 0.5; among those polymers, those having an average molecular weight between 10,000 and 1 million, still more preferably those having an average molecular weight between 100,000 and 250,000 are particularly interesting;
- poly(tetrafluoroethylenes), also called (PTFE), of chemical formula $(CF_2—CF_2)_n$, in which n varies between 5 and 20,000, preferably n varying from 50 to 10,000; among those polymers, those having an average molecular weight between 500 and 5 million, still more preferably those having an average molecular weight between 5,000 and 1,000,000, preferably about 200,000 are particularly interesting;
- poly(ethylene-co-propylene-co-5-methylene-2-norbornenes) or ethylene propylene-diene copolymers, also called EPDM, preferably those having an average molecular weight between 10,000 and 250,000, preferably between 20,000 and 100,000; and
- poly(methylmethacrylates) also called (PMMA), of formula $[(CH_2—C(CH_3)/(CO_2CH_3)]_n$, in which n preferably varies between 100 and 10,000, still more preferably n varying from 500 to 5000; among those polymers, those having an average molecular weight between 10,000 and 1 million, preferably those having an average molecular weight between 50,000 and 500,000, are particularly interesting; and
- mixtures of at least two of these materials.

The preparation of this type of separator is advantageously carried out by utilizing the techniques described in Coating Technology Handbook by Satas Armek 1991, part II, pages 103 to 321, Coating and Processing Techniques.

By way of examples of known separators one may mentioned those of the PEO-PPO polyether copolymer type, those of the 3 branch polyether type as defined for example in U.S. Pat. No. 6,190,804 or those of the 4 branch polymer type as defined in U.S. Pat. No. 6,280,882. The content of these two patents and, in particular respectively columns 1 and 2, is incorporated by reference in the present application.

Particularly interesting results have been obtained by using a separator obtained from the 4 branch polyether manufactured by DKS Japan and sold under the trademark ELEXCEL® ERM1.

A fourth object of the present invention consists of electrochemical systems capable of being obtained by a process according to the third object of the present invention, as well as those comprising at least one electrode obtained by implementation of a process according to the first object of the present invention.

In systems of this nature one of the originalities resides in the fact that the polymer solution has dried at the surface of the electrode support and that the result, for example in the case of aqueous solutions of SBR, is a binding of SBR at the surface of the electrode support.

In systems of this nature, the separator may be of the gel, solid or liquid electrolyte type and it is advantageously of the gel type.

According to an advantageous embodiment, the electrolyte includes a least one salt and at least one solvent.

The molar concentration of salt in the electrolyte, is then preferably lower than or equal to 1, and the molar concentration of solvent, for its part, is advantageously higher than or equal to 1.

The salt that is used is preferably a salt of the imide family, of the type $LiPF_6$, $LiBF_4$, LiBOB, LiTFSI or LiFSI or mixtures thereof, such as a mixture of LiBOB and LiFSI.

The solvents used preferably have a high boiling point that is higher than 100° Celsius. Such solvents may include those of the type γ BL, TESA, or modified TESA, or mixtures of at least two of these solvents.

EC (ethylene carbonate) and PC (propylene carbonate) solvents are normally used for the formation of a passivation film in the case of carbon based anodes, and the PC solvent is used to achieve low temperature applications.

In such systems, the electrolyte for the all gel battery is advantageously obtained from a precursor of a compound of a) a polymer+b) a liquid electrolyte.

The content of a) may vary between 1 and 99%, preferably this content varies between 5 and 25%; and the content of b) may vary between 1 and 99%, preferably this content varies between 75 and 95% and the contents a and b agree with the relation (a)+(b)=100%, the % being given by weight.

According to another advantageous embodiment, the thermo-initiator is added in quantities that are in proportion to the total weight a)+b), i.e. preferably in amounts between 100 and 5000 ppm, still more preferably between 500 and 1000 ppm.

The composition of the polymer is preferably low i.e. about 5% of a 4 branch polyether, preferably of the ELE-CEL® type and about 95% of an electrolyte of composition (1.5 LiTFSI+EC+PC+TESA+γBL (1:1:1:1)).

For its part, the lithium salt concentration is advantageously higher than or equal to 1 M (1 molar) in the case of gels, and the lithium salt concentration is lower than or equal to 1 M (1 molar) in the liquid electrolyte.

Among these electrochemical systems, one may advantageously mention those including at least one anode, at least one cathode and at least one separator and in which at least two, and preferably at least three of the constituents of the system have been prepared by implementation of any one of the processes according to the first object of the invention.

Similarly, the electrochemical systems in which the constituents have been substantially prepared without using organic solvents, are particularly interesting, and those obtained without any organic solvent are preferred.

A fifth object of the present invention relates to the use of a water soluble polymer, preferably a polymer of the styrene butadiene rubber type, still more preferably a SBR sold by NIPPON ZEON'S BINDER BATTERY GRADE (BM-400B) as a binder in an aqueous solution for the preparation of a film for coating part or the totality of an electrode support.

This use has the advantage of being used, without any formation of HF, due to the fact for example of the use of an imide salt in place of $LiPF_6$ which is found in commercial batteries.

Preparation of the film is carried out by cross-linking the polymer solution that coats the electrode for example by thermal radiation after the electrode has been placed in the battery and the battery has been sealed.

The polymer solution is normally selected so that the polymerization temperature is between 40 and 80° Celsius and so that cross-linking of the polymer solution is carried out by infra-red.

The time of cross-linking of the polymer is advantageously between 5 minutes and 2 hours.

By way of example, polymerization is carried out at about 80° Celsius and during about 10 minutes.

The use of the invention is particularly adapted for the manufacture of batteries of the flexible type such as those of the multi-layer metal plastic type.

This use allows a reduction of the manufacturing costs for example due to the fact that it is no more required to have a protective layer against HF and also due to the fact that the costs concerning organic solvents are eliminated.

Another particularly interesting application resides in the preparation of super condensers preferably in the preparation of super condensers of the hybrid type as well as in the preparation of cathodes from an aluminum type of support of the expanded metal EXMET® type.

Another interesting variant resides in the use of an anode support of the copper type, preferably EXMET, for the preparation of anodes, when the average voltage is lower than or equal to 1.6 Volts and the cathode support is made of aluminum when the average voltage is higher than 1.6 Volts.

DESCRIPTION OF PREFERRED EMBODIMENTS OF THE INVENTION

Generally, during implementation of the processes of the invention, the so called high speed techniques such as extrusion or vertical spreading on EXMET may be used, however extrusion is the recommended process.

The binder without fluorine is dissolved in water which facilitates the process of extrusion and increases the speed of the processes.

The presence of graphite in the anode and in the cathode acts as lubricant and makes it possible, for example, when utilizing extrusion, to homogenize the thickness of the electrode and to decrease its resistance by controlling porosity.

The solvent used, whether dealing with the anode or the cathode, is water, which makes the process safe, environmentally safe and not expensive. The use of an imide type of salt (without formation of HF) provides for a good conductivity of the electrolyte and increases the security of the battery.

The new process according to the invention is applicable for example to the production of inexpensive and safe Li-ion batteries. Such batteries include at least the 4 following parts: an anode; a cathode; a separator; an electrolyte.

EXAMPLES

The following examples are given purely as illustration and should not be interpreted as constituting any kind of limitation of the invention.

1. Use of the Process for the Preparation of an Anode

The anode is made of spherical graphite particles having an average size of 20 μm, that are coated with 1% of particles of a prismatic graphite whose size is 4 μm; mixture is ensured by mechano-fusion, also known as mechano-melting or by hybridization. In this manner, 95% of graphite is mixed with 5% of a SBR such as (NIPPON ZEON'S BINDER BATTERY GRADE (BM-400B)) that is used as binder, the latter being put into solution in water.

An optimum concentration is selected for the extrusion or spreading on copper (preferably on an expanded metal called EXMET).

The spherical graphite is selected because of the lithium diffusion speed at its surface and of its reversible capacity of the order of 370 mAh/g. For its part, prismatic carbon is selected as a conductivity bridge between the spherical particles, which decreases the resistance of the electrode. The purpose of using prismatic graphite (associated with the presence of basal surfaces) is to make sure that the electrode is lubricated; in particular during extrusion or spreading, which has the effect of homogenizing the thickness and the porosity of the electrode. On line drying by infra-red simplifies the machinery and the process.

Heating is also used to remove traces of water ($H_2O$). The fact that the electrode is not salted (no salt) permits to improve the electrochemical performances of the battery without production of HF.

The other advantage associated with this electrode is the use of a non-fluorinated binder, which eliminates all reaction with the electrolyte or all parasite reaction with formation of HF. This has an influence on the choice of the multilayer material, of the metal plastic that is used as battery casing and makes it possible to prevent using a protective layer against HF, which limits by as much manufacturing costs.

In this process, the starting solvent is water. This is beneficial to the environment and requires no special installation (such as an anhydrous chamber for the recovery of the solvent with special precautionary measures).

2. Use of the Process for the Preparation of the Cathode

The cathode preferably consists of $LiFePO_4$ (from Phostech Inc.). $LiFePO_4$ is coated with 3% Ketjen black and 3% natural or artificial graphite. The coating process is made possible by mechano-fusion, also known as mechano-melting or by hybridization.

Ketjen black is used to constitute the electronic conductivity network in the electrode. Graphite has a double function. First, it provides a junction bridge between $LiFePO_4$ and Ketjen black, which brings a low resistance to the electrode. Graphite also acts as lubricant to facilitate spreading, in particular by extrusion, by providing an electrode with a good uniformity and a controlled porosity.

The compound $LiFePO_4$/carbon (Ketjen black)/graphite is mixed with 5% SBR binder, from (NIPPON ZEON'S BINDER BATTERY GRADE (BM-400b)) that is put in solution by dissolution in water.

Spreading of the composite is carried out by extrusion or by Doctor Blade (horizontal or vertical), preferably by extrusion. Drying is achieved as in the case for the preparation of the anode described in part 1, that uses infra-red.

The process that is used for the preparation of the cathode is similar to the one used for preparing the anode.

It requires the use:
of $H_2O$ as solvent;
of a lubricating and conductive graphite;
of infra-red as drying means; and
of a binder without fluorine of the type SBR; (NIPPON ZEON'S BINDER BATTERY GRADE (BM-400B).

It permits to prevent using:
a salt;
an anhydrous chamber; and
special precautionary measures.

$LiFeO_4$ is completely charged at 3.8 Volts, without for this reason decomposing the SBR of (NIPPON ZEON'S BINDER GRADE(BM-400B). The use of an imide type of salt has no effect on the corrosion of the aluminum collectors, preferably of the type EXMET, which is advantageous for the energy density of the battery.

3. Process for Preparing a Separator a. Separator for Liquid and Electrolyte Gel The separator is preferably of the PP (polypropylene) or PE (polyethylene) type or mixtures thereof. It is preferably obtained by extrusion. The porosity of this separator is about 30 to 50%, which gives more space for the electrolyte and in particular for the gel. This membrane is called "Free Solvent". The separator is cross-linked by UV thermal heating, E-Beam, or IR (thermal). Cross-linking is preferably carried out by IR on a protection line.

b. Polymer Separator

The use of this separator in the battery still limits the use of PP or PE. The advantage of a separator made of a polymer is for security reason, since it forms a physical and chemical gel with the electrolyte.

The separator is preferably made of a polyether of the PEO-PPO copolymer type (polyoxyethylene-polyoxypropylene) of the 3 branch or 4 branch type, preferably a 4 branch polyether (sold by DKS under the designation Elexel® 217). These polyethers are practically liquid at room temperature. Their use within the framework of the extrusion process requires no addition of solvent, which overcomes the problem of harms to the environment.

Cross-linking of this type of polymer is carried out thermally by E-Beam, IR or UV.

4. Assembling a Li-Ion Battery (FIGS. 1-4)

a. All Liquid

The three films anode/separator: PP or PE/cathode are wound together according to the desired capacity (in mAh or Ah); when winding, a pressure of 10 psi is applied. Tabs (current connectors) of the Al and nickel type are welded by ultrasound (ATM207), respectively on the Al collector of the cathode and the copper of the anode.

The 3 film winding is introduced into a metal plastic bag, without HF protector.

Injection of the liquid electrolyte is carried out after achieving a complete vacuum in the metal plastic bag. The liquid electrolyte is a mixture of salts and solvents, the salt is of the imide type such as LiTFSI and/or LiFSI, the solvent or the mixture of solvents used preferably has a high boiling point. By way of example of solvents that can be used in this context, the following mixtures are mentioned:

EC+γ BL
EC+TESA (or modified TESA)
or
PC+EC+γ BL
PC+EC+TESA (or modified TESA)
PC+EC+γ BL+TESA (or modified TESA)

Concentration of the salt in the case of liquids is ≤1 M (1 molar). Once the battery has been sealed, the electrochemical formation of the battery is carried out by applying small currents to obtain a uniform passivation film on the surface of the anode (graphite/ellipsoid).

b. Gel with PP or PE Separator

The process of part 4b is essentially the same as the one described in part 4a.

The electrolyte gel precursor is made of 5% polymer (Excel)+95% (1.5 M LiTFSI)+EC+PC+γ BL 1:1:3)+1000 ppm of a thermo-initiator that is preferably Perkadox 16. This combination does not limit the choice of the electrolyte.

The electrolyte is injected after achieving a complete vacuum in the bag of the battery, including the 3 films (anode/separator PP/cathode).

Once the battery has been sealed, the gel is obtained by thermal treatment at 80° Celsius, during 10 minutes, preferably by IR during 10 minutes. An in situ impedance measurement follows the evolution of the resistance of the electrolyte. After implementation of the polymerization, the battery is electrochemically formed, as in the equivalent portion of part 4b. The gel concentration is then constant in the separator, in the anode and in the cathode.

c. Gel with Polyether Separator

The 3 films anode/polyether/cathode are wound together and are introduced into a bag of the metal plastic type. The gel precursor is of the same nature as the precursor already described in part 4b). The gel precursor is introduced in the metal plastic bag after a complete vacuum. Polymerization is obtained at 80° Celsius during 10 minutes or preferably with IR (infra-red) once the battery has been sealed. A formation as in the case of 4b is applied to the battery. The gel concentrations in the separator and in the electrodes are different.

5. Other Technologies

The implementation of this new process is not limited to the use of graphite as active material of the anode or to the use of $LiFePO_4$ as active material of the cathode.

By way of example, a few anodes of the type Si, $Li_4Ti_5O_{12}$ or Sn based alloys or the like may be mentioned; the cathode may comprise $LiCoO_2$ or $LiMn_{0.5}Ni_{0.5}O_2$, $LiNi_xCo_yAl_z$ or the like.

The gel may also be of the PVDF type or may consist of a mixture of polyether+PVPF or polyether+PMMA or the like.

The process may easily be adapted for a hybrid super condenser of the type:

5a) $Li_4Ti_5O_{12}$/electrolyte/carbon;
5b) $WO_2$/electrolyte/carbon;
5c) Graphite/electrolyte/carbon; and
5d) Si/electrolyte/carbon or other combination.

Example 1

Production of the anode is carried out by using a spherical graphite whose particles have an average size of 20 μm. These particles have been obtained by mechano-melting (Hosokawa, Japan). 95% of graphite is mixed with 8% of STYRENE BUTADIENE RUBBER (STYRENE BUTADIENE RUBBER (SBR)) dissolved in water. This mixture is applied on a copper collector by the Doctor Blade® method. The electrode thus obtained is dried under vacuum at 120° Celsius during 24 hours. This electrode is mounted opposite a metallic lithium and it is separated by a Celgard (EC-DMC-$LIBF_4$) type of film. There is thus obtained an electrochemical cell with a 4 $cm^2$ surface.

Figure 5:
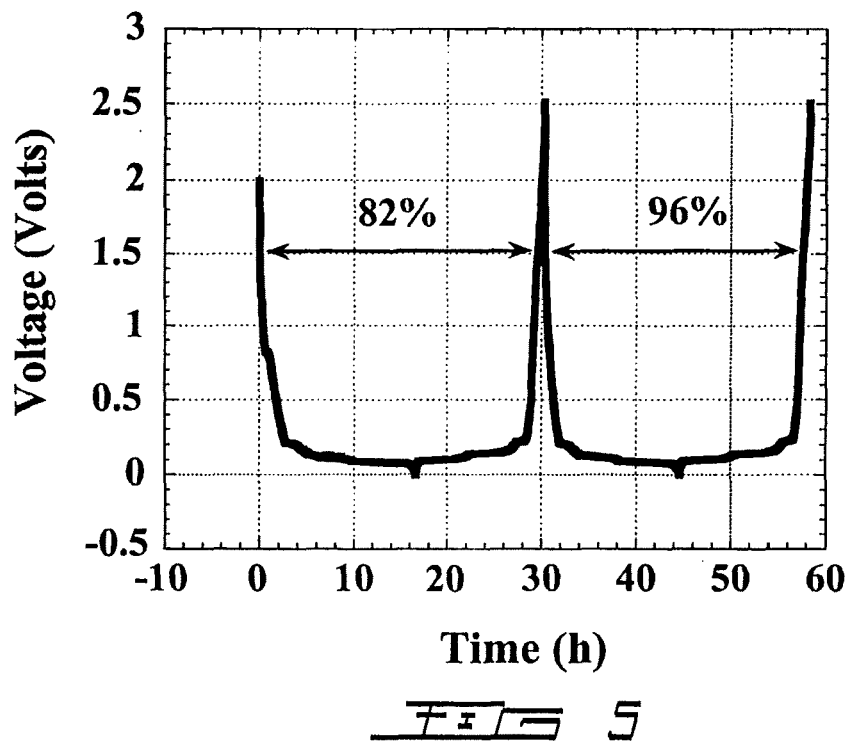
FIG. 5 represents the charge-discharge curve of a graphite/Celgard (EC-DMC-LiBF$_4$)Li anode prepared with a water soluble binder.

The battery is cycled between 0.0 and 2.5 Volts at a rate of C/12. FIG. 5 shows the result of the first two cycles of the cell with a coulombic efficiency of 82.0% and 96.1% respectively during the first and second cycles.

Example 2

The cathode that is prepared contains particles of $LiFePO_4$ (Phostech Inc.) coated with 3% Ketjen black. The coating process is carried out by mechano-melting (Hosokawa, Japan).

The compound $LiFePO_4$/carbon (Ketjen black) is mixed with 5% of STYRENE BUTADIENE RUBBER (STYRENE BUTADIENE RUBBER (SBR) dissolved in water. This mixture is applied on an aluminum collector by the Doctor Blade® method. The electrode thus obtained is dried under vacuum at 120° Celsius during 24 hours. This electrode is mounted opposite a metallic lithium and is separated by a Celgard type of film (EC-PC-DMC-$LiBF_4$). There is thus obtained an electrochemical cell with a 4 $cm^2$ surface.

Figure 6:
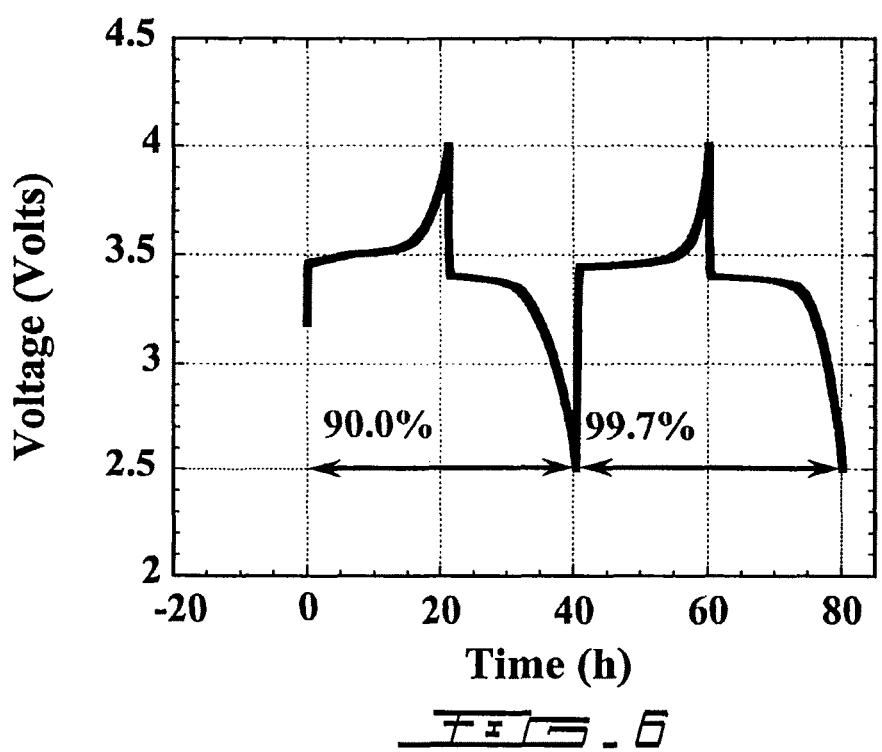
FIG. 6 represents the charge-discharge curve of a LiFePO$_4$/Celgard (EC-PC-DMC-LiBF$_4$)Li cathode prepared with a water soluble binder.

The battery is cycled between 2.5 and 4.0 Volts at a rate of C/24. FIG. 6 shows the electrochemical result of the first two cycles of the cell with a coulombic efficiency of 90.0% and 99.7% respectively during the first and second cycle.

Although the present invention has been described by means of specific embodiments, it is understood that many variations and modifications may be grafted to said embodiments, and the present invention aims at covering such modifications, uses or adaptations of the present invention following in general, the principles of the invention and including any variation of the present invention that will become known or are conventional in the field of activity of the present invention, and that may apply to the essential elements mentioned above, in accordance with the scope of the following claims.

EMBODIMENTS

1. Process for preparing an electrode that is at least partly coated with a film obtained by spreading and drying, on an electrode support, an aqueous solution comprising at least one active material, at least one water soluble binder and at least one water soluble thickener.

2. Process according to embodiment 1, in which the active material is selected from the group consisting of:
a. metallic oxides;
b. ceramics;
c. carbon, natural graphite and synthetic graphite;
d. metals;
e. semi-conductor materials; and
f. mixtures of at least two thereof.

3. Process according to embodiment 2, in which:
a. the metallic oxide is selected from the group consisting of LiMn2O4, LiCoO2 and LiNiO2;
b. the carbon is selected from the group consisting of high surface area carbon, graphite, carbon fibers and cokes;
c. the metals are selected from the group consisting of Ag, Sn, and Cu; and
d. the semi-conductor material is Si.

4. Process according to any one of embodiments 1 to 3, in which the chemically and/or electrochemically active material is in the form of powder whose average particle size is between 10 nanometers and 50 micrometers.

5. Process according to embodiment 4, in which the powder has a granular dispersion between 200 nanometers and 25 micrometers.

6. Process according to any one of embodiments 1 to 5, in which at least 20% of the binder and/or thickener are water soluble at the rate of 20 grams in 100 grams of water, at room temperature.

7. Process according to embodiment 6, in which at least 50% of the binder and/or thickener are soluble.

8. Process according to embodiment 7, in which at least 90% of the binder and/or thickener are soluble.

9. Process according to embodiment 8, in which the water soluble thickener is selected from the group consisting of natural celluloses, modified celluloses, natural polysaccharides and modified polysaccharides.

10. Process according to embodiment 9, in which the soluble thickener has a molecular weight between 27,000 and 250,000.

11. Process according to embodiment 9 or 10, in which the thickener is selected from the group consisting of carboxymethylcelluloses, hydroxymethylcelluloses and methylethylhydroxycelluloses.

12. Process according to any one of embodiments 1 to 11, in which the thickener is selected from the group consisting of carboxymethylcelluloses of the type Cellogen®.

13. Process according to embodiment 12, in which the thickener is selected from the group consisting of EP, 7A, WSC. BS-H and 3H carboxymethylcelluloses, sold by Daiichi Kogyo Seiyaku Co. of Japan.

14. Process according to any one of embodiments 1 to 14, in which the binder is a natural or synthetic rubber.

15. Process according to any one of embodiments 1 to 14, in which the binder is of the non-fluorinated type or of the low fluorinated type.

16. Process according to embodiment 14 or 15, in which the rubber is selected from the group consisting of SBR's, NBR's, HNBR's, CHR's and ACM's.

17. Process according to embodiment 15 or 16, in which the rubber is a SBR characterized in the form of a paste at room temperature.

18. Process according to embodiment 17, in which the STYRENE BUTADIENE RUBBER (SBR) selected is the one sold by NIPPON ZEON'S BINDER BATTERY GRADE (BM-400B) or the like.

19. Process according to any one of embodiments 13 to 18, in which the thickener is EP and/or 3H.
20. Process according to any one of embodiments 1 to 19, in which the electrode is an anode and the aqueous solution used for spreading contains by weight:
a. at least 64% graphite; and
b. at least 3% water soluble binder,
c. from 0.1 to 2% thickener; and
d. at most 27% water.
21. Process according to any one of embodiments 1 to 19, in which the electrode is a cathode and the aqueous solution used for spreading contains by weight:
a. at least 64% LiFePO4; and
b. at least 3% water soluble binder,
c. from 0.1 to 2% thickener; and
d. at most 27% water.
22. Process according to any one of embodiments 1 to 21, in which at least 95% of the water that is present in the spreading solution is evaporated after spreading.
23. Process according to embodiment 22, in which the traces of H2O that are present at the surface of the electrode, after its coating with the aqueous solution, are removed by heat treatment in line of the EXT, DBH and/or DB process or by Infrared, preferably at a temperature between 80 and 130° Celsius for a period of time between 1 and 12 hours.
24. Process according to embodiment 10, in which the electrode is of the non-salted type.
25. Process according to any one of embodiments 1 to 24, carried out in ambient air and by using the Doctor Blade extrusion method and/or the electrostatic method.
26. Process according to any one of embodiments 1 to 20 and 22 to 25, in which the electrode is negative and the electrochemically active material used is selected from the group consisting of powders of the graphite, alloy of Sn, of Si, Li4Ti5O12, WO2 types and mixtures of at least two of these components.
27. Process according to embodiment 26, in which the graphite powder consists of ellipsoidal shaped particles coated with prismatic shaped graphite particles.
28. Process according to embodiment 20, in which coating of ellipsoidal graphite with prismatic graphite is obtained by mechano-melting and/or by hybridization.
29. Process according to any one of embodiments 1 to 19, 21 and 22 in which the electrode is positive and the electrochemically active material is selected from the group consisting of powders of LiCoO2, LiNiO2, Li2Mn2O4, LiNi0.5Mn0.5O2, LiFePO4 coated with graphite and carbon and mixtures of at least two thereof.
30. Process according to embodiment 29, in which the electrode is prepared from particles of LiFePO4 coated with particles of graphite and/or carbon.
31. Process according to embodiment 30, in which the specific surface area of the carbon present in the coating, measured by BET, is ≤50 m2/g.
32. Process according to embodiment 30 or 31, in which coating of LiFePO4 with carbon and/or graphite is carried out by mechano-melting or by hybridization.
33. Electrode consisting of a support coated at least in part with a film containing one active material, said electrode being obtained by implementation of one of the processes according to any one of embodiments 1 to 25.
34. Electrode according to embodiment 33, that is a cathode in which the electrode support consists at least in part of stainless, aluminum, copper, carbon, metal-plastic or a mixture of at least two of these materials.
35. Electrode according to embodiment 33 that is an anode in which the electrode support consists at least in part of copper, metal-plastic, or a mixture of at least two thereof.
36. Electrode according to any one of embodiments 33 to 35, having at least one of the following properties:
a. storage stability, preferably higher than 1 year, in the presence of a moisture content higher than 50% and in the presence of temperatures higher than 20° Celsius;
b. a film thickness when the latter is graphite based that is between 10 and 100 µm, still more preferably between 20 and 45 µm and according to the most advantageous mode the film has a thickness of about 45 µm;
c. a film thickness when the latter is iron and/or phosphate based that is between 20 and 200 µm, still more preferably between 20 and 110 µm, the most advantageous mode being the one in which the film has a thickness of about 90 µm;
d. electrochemical performances that compare to those of corresponding electrodes obtained with the same active material but by using an organic solvent solution; and
e. an electrode film characterized by the fact that particles of rubber are directly attached to the electrode support.
37. Electrode according to embodiment 36, in which the porosity of the film that coats one or more of the electrodes, measured according to the method of thickness measurement, is between 10 and 90%.
38. Electrode according to embodiment 37, in which the porosity is between 30 and 40%.
39. Process for preparing an electrochemical system from its constituents including at least one anode, at least one cathode and at least one separator, in which at least one anode and/or at least one cathode has been obtained by a process described in any one of embodiments 1 to 32 or as defined in any one of embodiments 33 to 38.
40. Process according to embodiment 39 for the preparation of a battery in which the separator is porous.
41. Process for preparing an electrochemical battery according to embodiment 40, in which the separator is preferably of the PP or PE type or of the (PP,PE) mixture type.
42. Process according to any one of embodiments 39 to 41, in which the separator is preferably obtained by extrusion.
43. Process according to embodiment 39, in which the separator is of the gel type.
44. Process according to embodiment 41, in which the separator is obtained from polymer materials of the type:
polyester,
poly(vinylydienefluoride) of chemical formula (CH2-CF2)n, with n preferably varying between 1000 and 4000, preferably such that n is close to 150, preferably those having an average molecular weight between 10,000 and 1 million, still more preferably those having an average molecular weight between 100,000 and 250,000;
poly(vinylydiene fluoro-co-hexafluoropropene) copolymers, of formula [(CH2-CF2)x(CF2-CF(CF3))1-x]n in which n varies from 1000 to 4000, preferably n varies from 2000 to 3000, still more preferably n is close to 150 and x preferably varies between 0.12 and 0.5, preferably those having an average molecular weight between 10,000 and 1 million, still more preferably those having an average molecular weight between 100,000 and 250,000;
poly(tetrafluoroethylenes), of chemical formula (CF2-CF2)n, with n varying from 5 to 20,000, preferably n varying from 50 to 10,000, preferably those having an average molecular weight between 500 and 5 million, still more preferably those having an average molecular weight between 5,000 and 1,000,000, preferably about 200,000;

poly(ethylene-co-propylene-co-5-methylene-2-norbornenes) or ethylene propylene-diene copolymers, also called EPDM, preferably those having an average molecular weight between 10,000 and 250,000, preferably between 20,000 and 100,000; and the poly(methylmethacrylates) also called (PMMA), of formula [(CH2-C(CH3)/(CO2CH3)]n, with n preferably varying between 100 and 10,000, still more preferably n varying from 500 to 5000, preferably those having an average molecular weight between 10,000 and 1 million, preferably those having an average molecular weight between 50,000 and 500,000; and mixtures of at least two thereof.

45. Process according to embodiment 44, in which the separator is of the polyether PEO-PPO copolymer type.

46. Process according to embodiment 44, in which the separator is of the 3 branch polyether type or of the 4 branch polymer type.

47. Process according to embodiment 46, in which the separator is preferably of the 4 branch polymer type manufactured by DKS Japan and sold under the trademark ELEXCEL® ERM1.

48. Electrochemical system that can be obtained by a process comprising at least one process step as defined in any one of embodiments 39 to 47.

49. Electrochemical system comprising at least one electrode obtained by implementation of a process according to any one of embodiments 1 to 32 or as defined in any one of embodiments 33 to 38, a separator of the gel, solid or liquid electrolyte type.

50. Electrochemical system according to embodiment 48 or 49, comprising an electrolyte gel.

51. System according to embodiment 50 of the all liquid battery type, in which the electrolyte includes at least one salt and at least one solvent.

52. System according to embodiment 51, in which the salt molar concentration, in the electrolyte, is lower than or equal to 1 and the solvent molar concentration is higher than or equal to 1.

53. System according to embodiment 51 or 52, in which the salt is preferably a salt of the imide family, of the type LiPF6, LiBF4, LiBOB, LiTFSI or LiFSI or a mixture of at least two of the latter, such as mixtures of LiBOB and LiFSI.

54. System according to any one of embodiments 51 to 53, in which the retained solvents have an elevated boiling point.

55. System according to embodiment 54, in which the solvent has a boiling point higher than 100° Celsius.

56. System according to embodiment 55, in which the solvent is of the type γBL, TESA, or modified TESA, or mixtures thereof.

57. System according to any one of embodiments 51 to 55, in which EC and PC solvents are used for the formation of the passivation film in the case of carbon based anodes, and PC solvent for low temperature applications.

58. System according to embodiment 57, in which the electrolyte for the all gel battery is obtained from a precursor made of a) a polymer+b) a liquid electrolyte.

59. System according to embodiment 58, in which the a) content varies from 1 to 99%, preferably this content varies from 5 to 25%; and the b) content varies from 1 to 99%, preferably this content varies from 75 to 95% and the a and b contents agree with the relation (a)+(b)=100%, the % being given in weight.

60. System according to embodiment 59, in which a thermoinitiator is added in amounts that are proportional to the total weight a)+b), or preferably in amounts between 100 and 5000 ppm, preferably in amounts between 500 and 1000 ppm.

61. System according to embodiment 60, in which the composition of the precursor is about 5% of a 4 branch polyether preferably of the ELECEL type, and about 95% of an electrolyte of composition (1.5 LiTFSI+EC+PC+TESA+γBL (1:1:1:2)).

62. System according to embodiment 61 in which, the concentration in lithium salt is higher than or equal to 1 M (1 molar) for the gels.

63. System according to embodiment 61, in which, the concentration in lithium salt is lower than or equal to 1 M (I molar) in the liquid electrolyte.

64. Use of a water soluble polymer, preferably a polymer of the Styrene Butadiene Rubber type, still more preferably a SBR sold by NIPPON ZEON'S BINDER BATTERY GRADE (BM-400B) as binder in an aqueous solution for the preparation of a film for coating part or the totality of an electrode support.

65. Use according to embodiment 64, without any formation of HF.

66. Use according to embodiment 65, in which the formation of HF is avoided by using an imide salt.

67. Use according to any one of embodiments 64 to 66, in which the preparation of the film is carried out by cross-linking the polymer solution that coats the electrode by using thermal radiation after the electrode has been placed in the battery, the battery is closed and sealed.

68. Use according to embodiment 67, in which cross-linking of the polymer solution is preferably carried out by Infra Red.

69. Use according to embodiment 67 or 68, in which the polymerization temperature is between 40 and 80° Celsius.

70. Use according to any one of embodiments 64 to 69, in which cross-linking of the polymer lasts between 5 minutes and 2 hours.

71. Use according to embodiment 70, in which the polymerization is carried out at about 80° Celsius and during about 10 minutes.

72. Use according to any one of embodiments 64 to 71, in which the battery is flexible and of the multilayer metal plastic type.

73. Use according to embodiment 72, for reducing the weight and cost of manufacture due to the fact that it is not required to have a protective layer against HF, that is removed during the process.

74. Use according to any one of embodiments 64 to 73, for the preparation of super condensers preferably for the preparation of hybrid type of super condensers.

75. Use according to any one of embodiments 64 to 73, in which the cathode support is of the aluminum type preferably of the EXMET® expanded metal type.

76. Use according to any one of embodiments 64 to 73, in which the anode support is of the full copper type, preferably EXMET® or conductive metal plastic when the average voltage is lower than or equal to 1.6 Volts and the cathode support is of full aluminum, preferably EXMET® or conductive metal plastic when the average voltage is higher than 1.6 Volts.

77. Process for preparing an electrochemical separator at least partly coated with a polymer type film, preferably of the SBR type that is water soluble.

78. Process for preparing an electrochemical separator according to the processes of preparing electrodes defined in any one of embodiments 1 to 32, except that the aqueous polymer solution that is used contains no active materials nor carbon, or very small quantities thereof.

79. Electrochemical system including at least three constituents namely at least one anode, at least one cathode and at least one separator and in which at least two, and preferably at least three of the constituents of the system have been prepared by implementation of one of the processes according to any one of embodiments 1 to 32 and/or by implementation of a process according to embodiment 77 or 78.

80. Electrochemical system according to embodiment 79 in which the constituents have been prepared without using organic solvents.

The invention claimed is:

1. Process for preparing an electrochemical system including at least one anode, at least one cathode and at least one separator, wherein the at least one anode and/or the at least one cathode consists of a support coated at least in part with a film containing an active material comprising LiFePO$_4$ coated with graphite and/or carbon, said process comprising preparing the active material by mechano-fusion or hybridization and spreading on the support an aqueous solution comprising the active material, at least one water soluble binder and at least one water soluble thickening agent.

2. Process according to claim 1 for preparation of an electrochemical battery in which the separator is porous.

3. Process for preparing an electrochemical battery according to claim 2, in which the separator comprises PP or PE or a mixture thereof.

4. Process according to claim 1, in which the separator is obtained by extrusion.

5. Process according to claim 1, in which the separator comprises a gel.

6. Process according to claim 3, in which the separator is obtained from a polymer materials selected from the group of:

polyester,
poly(vinylydienefluoride) of chemical formula $(CH_2-CF_2)_n$, with n varying between 1000 and 4000;
poly(vinylydiene fluoro-co-hexafluoropropene) copolymers, of formula $[(CH_2-CF_2)_x(CF_2-CF(CF_3))_{1-x}]_n$ in which n varies from 1000 to 4000, and x varies between 0.12 and 0.5;
poly(tetrafluoroethylenes), of chemical formula $(CF_2-CF_2)_n$, with n varying from 5 to 20,000;
poly(ethylene-co-propylene-co-5-methylene-2-nor-bornenes) or ethylene propylene-diene copolymers;
the poly(methylmethacrylates), of formula $[(CH_2-C(CH_3)/(CO_2CH_3)]_n$, with n varying between 100 and 10,000; and
mixtures of at least two thereof.

7. Process according to claim 6, in which the separator comprises a polyether PEO-PPO copolymer.

8. Process according to claim 7, in which the separator comprises a 3 branch polymer or a 4 branch polymer.

9. Process according to claim 8, in which the separator comprises a 4 branch polymer.

* * * * *